US009524651B2

(12) United States Patent
Fix et al.

(10) Patent No.: US 9,524,651 B2
(45) Date of Patent: Dec. 20, 2016

(54) SYSTEM AND METHOD FOR ELECTRONIC COMMUNICATION USING A VOICEOVER IN COMBINATION WITH USER INTERACTION EVENTS ON A SELECTED BACKGROUND

(76) Inventors: Raymond Fix, Huntington Beach, CA (US); Sanjay Nichani, San Diego, CA (US); Chethan Reddy, San Diego, CA (US)

( * ) Notice: Subject to any disclaimer, the term of this patent is extended or adjusted under 35 U.S.C. 154(b) by 302 days.

(21) Appl. No.: 13/556,813

(22) Filed: Jul. 24, 2012

(65) Prior Publication Data

US 2013/0028400 A1    Jan. 31, 2013

Related U.S. Application Data

(60) Provisional application No. 61/511,393, filed on Jul. 25, 2011.

(51) Int. Cl.
*H04M 11/00* (2006.01)
*G09B 5/12* (2006.01)
*H04L 12/58* (2006.01)
*G06K 9/54* (2006.01)

(52) U.S. Cl.
CPC ............. *G09B 5/12* (2013.01); *H04L 12/589* (2013.01)

(58) Field of Classification Search
CPC ..... G11B 27/329; H04N 5/772; H04N 9/8042; H04N 9/8063

USPC ........... 379/88.01–88.19; 382/100, 305, 311
See application file for complete search history.

(56) References Cited

U.S. PATENT DOCUMENTS

| | | | |
|---|---|---|---|
| 6,518,978 B1* | 2/2003 | Omata et al. ................. 715/723 |
| 8,385,588 B2* | 2/2013 | Jacoby et al. ................ 382/100 |
| 2006/0177153 A1* | 8/2006 | King et al. .................... 382/305 |
| 2010/0061197 A1* | 3/2010 | Yoshikawa et al. ............. 369/1 |
| 2011/0032388 A1* | 2/2011 | Manico et al. .......... 348/231.99 |
| 2012/0315013 A1* | 12/2012 | Wing ................... G11B 27/329 386/241 |
| 2012/0323581 A1* | 12/2012 | Strietzel et al. ............. 704/276 |
| 2013/0204414 A1* | 8/2013 | Yoshikawa et al. ............ 700/94 |

* cited by examiner

*Primary Examiner* — Solomon Bezuayehu
(74) *Attorney, Agent, or Firm* — Russ Weinzimmer & Associates, PC

(57) ABSTRACT

A user-friendly and interactively created multimedia electronic message, as well as a system and method for creating such messages, combines an audio component (e.g. a voiceover, music, etc.) with user-interaction events that act upon selected visual media that serve as a visual background to the message. The visual media can be images, sequences of images, video, files such as documents or simply a pre-established library of background templates. The user interaction events can be sketch animations, text animations, symbols, shapes, emoticons and image transformation (e.g. pan, zoom, rotation, etc.) events. The user-interaction events may be time-correlated with the audio component through a common clock that is initiated by, and runs throughout, the audio recordation process, or they may be added outside of the audio component time-line.

20 Claims, 10 Drawing Sheets

SYSTEM AND METHOD FOR ELECTRONIC COMMUNICATION USING A VOICEOVER IN COMBINATION WITH USER INTERACTION EVENTS ON A SELECTED BACKGROUND

CROSS-REFERENCE TO RELATED APPLICATIONS

This application claims the benefit of U.S. provisional application Ser. No. 61/511,393, which was filed on 25 Jul. 2011.

FIELD OF THE INVENTION

This application relates generally to electronic communications, and more specifically to electronic communications combining visual content with audio content.

BACKGROUND OF THE INVENTION

There are a myriad of different formats by which individuals communicate electronically in non real-time or quasi real-time. The targeted recipient of the message can be another individual (i.e. peer-to-peer), a group of individuals (i.e. peer-to-many) or the public at large (i.e. a broadcast).

One such peer-to-peer format is voicemail, which is a computer based system that allows users and subscribers to exchange personal voice messages, select and deliver voice information and process transactions relating to individuals, organizations, products and services using an ordinary telephone. The term voicemail can also more broadly denote any system of conveying stored telecommunications as voice messages, including using an answering machine. Most cell phone services offer voicemail as a basic feature, and many land line phones and corporate private branch exchanges (PBXs) include voicemail services.

Electronic mail, commonly called email or e-mail, is a method of exchanging digital messages from an author to one or more recipients (peer-to-peer or peer-to-many). Modem email operates across the Internet or other computer networks. Current email systems are typically implemented based on a store-and-forward model. Email servers accept, forward, deliver and store messages. The computers of neither the author nor the recipient(s) are required to be online simultaneously. Rather, they need only connect briefly to a network coupled typically to an email server, for as long as it takes to send or receive the email messages. Email messages are often conveyed using text, with attachments that can be other documents, pictures or video.

Text messaging is one of the most widely used telecommunications applications in the world. The SMS (Short Message Service) service component of phone, web or mobile communication systems employs standardized communication protocols to allow the exchange of short text messages (i.e. up to 160 characters) between fixed line or mobile phone devices. Most SMS messages are mobile-to-mobile text messages though the standard supports other types of broadcast messaging as well. An extension of the core SMS (Short Message Service) is the MMS (Multimedia Messaging Service). This standard format permits text messages to and from mobile devices to include multimedia content (e.g. images, video and audio) in addition to the text content of the message. Text messages can also be employed by individuals to interact with automated systems to order products and services directly from their mobile phones or to participate in surveys, contests and the like. Advertisers and service providers use texts to notify mobile phone users about promotions, payment due dates and other subject matter which has heretofore been sent by post, e-mail or voicemail.

Examples of currently popular broadcast messaging formats include webcasts, screencasts and podcasts. A webcast is a media presentation distributed over the Internet using streaming media technology to distribute a single content source to many simultaneous listeners/viewers. A webcast may either be distributed live or on demand. Essentially, webcasting is "broadcasting" over the Internet. A screencast is a digital recording of a computer screen output, also sometimes referred to as video screen capture. Screencasts are similar to screenshots, but a screenshot is a picture of a computer screen and its content, whereas a screencast is essentially a movie of the changes in display content over time that a user sees on a computer screen. Screencasts are often enhanced with audio narration making reference to the changes in display content.

A podcast (or non-streamed webcast) is a series of digital media files (either audio or video) each being released episodically. A podcast is often downloaded through web syndication. The mode of delivery differentiates podcasting from other means of accessing media files over the Internet, such as direct download or streamed webcasting. For a podcast, list of all the audio or video files currently associated with a given series is maintained centrally on the distributor's server as a web feed. The listener or viewer typically employs special client application software known as a pod-catcher that can access this web feed, check it for updates and download any new files in the series. This process can be automated so that new files are downloaded automatically. Files are stored locally on the user's computer or other device and they remain ready for offline use. The user therefore provided with simple access to episodic content whenever convenient.

Really Simple Syndication (RSS) is a family of web feed formats used to publish frequently updated works such as blog entries, news headlines, audio, and video in a standardized format. An RSS document (which is called a "feed", "web feed", or "channel") includes full or summarized text and metadata such as publishing dates and authorship. RSS feeds benefit publishers by letting them syndicate content automatically. A standardized XML file format allows the information to be published once and viewed by many different programs. RSS feeds benefit readers who want to subscribe to timely updates from favored websites or to aggregate feeds from many sites into one place.

RSS feeds can be read using software typically referred to as an RSS reader, feed reader or aggregator. Such programs can be web-based, desktop-based or mobile-device-based. The user subscribes to a feed by entering into the reader the feed's URI, or by clicking a feed icon in a web browser that initiates the subscription process. The RSS reader checks the user's subscribed feeds regularly for new work, downloads any updates that it finds, and provides a user interface to monitor and read the feeds. RSS allows users to avoid manually inspecting all of the websites they are interested in. Rather, they simply subscribe to websites and all new content added to the website is pushed onto the subscriber's browser when it becomes available.

Another form of electronic communication that has recently exploded in popularity is the use of social media networking sites such as Facebook, Twitter, Youtube, Flickr and the like. Such sites enable users to post text, pictures and video and permits communication as an interactive dialogue between an individual and numerous friends and subscribers. Social media can take on many different forms, including Internet forums, web-blogs, social blogs, micro-blogging, wilds, podcasts, photographs or pictures, video, rating and social bookmarking. Such activities are facilitated by by technologies including blogs, picture-sharing, vlogs, wallpostings, email, instant messaging, music-sharing, crowd-sourcing, and voice over IP, to name a few. Many of these social media services can be integrated via social network aggregation platforms.

As outlined above, there are a variety of methods by which to communicate electronically, but in every one of them, the various media elements and accompanying user-interaction events are at the very least, very loosely coupled, and in some formats there is lack of any form of correlation whatsoever. While a video inherently couples visual elements with audio contained therein, and can be sent to others by email, or made available to the public when uploaded to Youtube, the equipment and software required to compose a video with user interaction however, is fairly elaborate and expensive, and often beyond the capabilities of the typical user.

In addition, while video might be reasonable to broadcast, it is not the best format when applied to a peer-to-peer mode of communication. First, because videos are very data intensive, they must be compressed to minimize their impact on communication channel bandwidth. There are a number of video compression encoding standards in use, and this means a recipient must have the right decoder to ensure that they can consume it. This renders communication using video between individuals difficult if they have different devices that are not compatible with one another. Moreover, resources are required to encode the video which must be done either on the client or the server when uploaded. Finally, the various media elements of a video (e.g. audio, visual backgrounds, and user interaction events) are flattened into a single object (the video itself). Thus, when video resolution is minimized to decrease costs and increase speed of upload, the various other media elements of the video are not available to the recipient at full resolution for purposes of collaboration or re-editing.

There have been some attempts in the recent past to combine various media elements, including audio, visual media such as video and images, and user interactions such as sketching, to provide more correlation between the elements in less flattened format. Such attempts have been geared more towards facilitating real-time collaboration between individuals working on large schematic documents. These types of products, however, tend to be sketch-centric products in which limited user interactive events such as sketching are used the correlating medium. Put another way, these products create a time-line that is based on sketching activity generated during creation of a message for purposes of collaborative editing of documents, which is not ideal for purposes of creating multimedia messages for communication by an individual to one or more peers.

SUMMARY OF THE INVENTION

The present invention is a user-friendly and interactively created multimedia electronic message, as well as a system and method for creating such messages. The message combines an audio component (e.g. a voice-over, music, etc.) with user-interaction events that act upon selected visual media that serve as a visual background to the message. The visual media can be images, sequences of images, video, files such as documents or simply a pre-established library of background templates. The user interaction events can be sketch animations, text animations, symbols, shapes, emoticons and image transformation (e.g. pan, zoom, rotation, etc.) events. The user-interaction events may be time-correlated with the audio component through a common clock that is initiated by, and runs throughout, the audio recordation process, or they may be added outside of the audio component time-line.

In an embodiment of a method of the invention, the method includes selecting one or more background visual media, recording one or more audio tracks, applying one or more user-interaction events to the one or more background visual media, generating a set of serialized event objects in the form of a time-line based on the selecting of a background medium, the recording of an audio track and applying user-interaction events. The serialized event objects of the message are the saved to a memory.

In another embodiment of the method, the message is viewed by accessing the serialized event objects of the message from memory, and then in accordance with the time-line, displaying the one or more selected background visual media and the one or more applied user-interaction events applied thereto, and playing the one or more audio tracks.

In still another embodiment, at least one of the one or more user-interaction events is applied to the background visual media during the recording of one of the one or more audio tracks. In other embodiments, user-interaction events applied during the recording of an audio track are time-stamped in accordance with the timing of the recorded audio track. One or more user-interaction events are also applied while not recording any of the one or more audio tracks.

In other aspects of the invention, at least one of the one or more audio tracks is a voiceover recorded using a microphone. In still other aspects of the invention, the saved message is uploaded to a host server over a network. In other embodiments, viewing the message further includes downloading the message from the host server to a client device over the network, the downloaded message being stored in the memory of the client device.

In other aspects of the invention, at least one the one or more selected background media is an image file, and in other embodiments, at least one the one or more selected background media is a video file.

In other aspects of the invention a computer software system of the invention includes a set of instructions for controlling one or more computer devices to enable a user to create and view an electronic multimedia message. The software system is stored on computer-readable media and when executed by the one or more computer devices, causes the computer device to select a background visual medium, record an audio track, apply none, one or more user-interaction events to the selected background visual medium while not recording the audio track, and apply one or more user-interaction events to the background visual medium while recording the audio track. The computer device is further instructed and is otherwise caused to repeat the selecting, recording and applying processes until the message is complete. A set of serialized event objects is generated in the form of a time-line based on the selecting, recording and applying processes, and the message is then saved in the form of the serialized event objects to memory.

The software system further enables the computer device to view the saved message by accessing the serialized event objects of the message from memory, and in accordance with the time-line: displaying the selected background visual media, displaying the applied user-interaction events and playing the recorded audio tracks.

In other aspects of the invention, user-interaction events applied during the recording of an audio track are time-stamped in accordance with the timing of the recorded audio track being recorded.

In an embodiment, at least one user-interaction event applied while recording an audio track is a sketching event. In another embodiment, at least one user-interaction event applied while not recording an audio track is an image transformation event.

In other embodiments, the software system includes a native application program that is stored in the memory of, and is executed by, a client computer device.

In other aspects of the invention, the software system uploads the saved message to a host server of a web site over the Internet. In another embodiment, viewing the message includes downloading the message from the web server to a client computer device over the network, the downloaded message being stored in the memory of the client computer device.

In other embodiments, the software system includes temporary code that is downloaded from the host server to the client computer device and is executed by a browser application running on the client computer device. In another embodiment, the native application includes a user interface for facilitating said selecting, recording and applying.

In other aspects of the invention, the selected background medium is a series of image files. In an alternate embodiment, a selected background medium is a video file.

BRIEF DESCRIPTION OF THE DRAWINGS

The following description can be better understood in light of Figures, in which.

DETAILED DESCRIPTION

Figure 1:
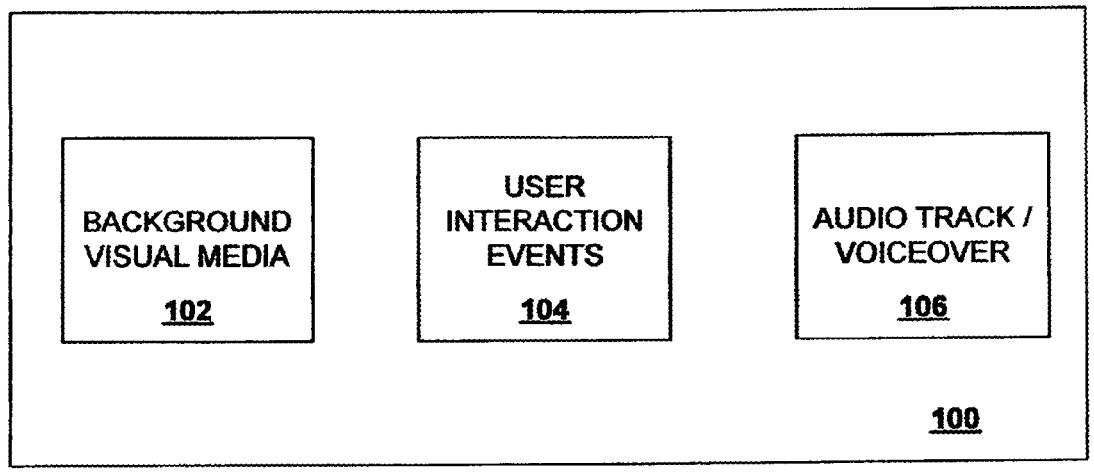
FIG. 1 is a block-level illustration of the elements of an embodiment of an electronic message of the invention.

FIG. 1 is a block diagram illustrating an embodiment of the multimedia message 100 of the invention. The multimedia message of the invention 100 combines an audio component (such as a voice-over or music recorded through a microphone, music or other pre-recorded music filed, etc.) 106, with user-interaction events 104 that act upon selected visual media 102 that serve as a background for the message, such as images, sequences of images, video, maps and documents. User-interaction events 104 can include, but are not limited to, pinch zoom events, sketch events, pen property changes, text input events, icon add events, icon drag events, adding new backgrounds events, and switching background events.

The multimedia message of the invention 100 can be created using a native software application that can be downloaded onto, for example, a computer, tablet, mobile handset, or other hand-held device. Alternatively, the software application used to create the multimedia message 100 of the invention can be deployed as temporary software, such as Javascript or flash code, which is downloaded to a browser that is being run by the devices described above.

Figure 2:
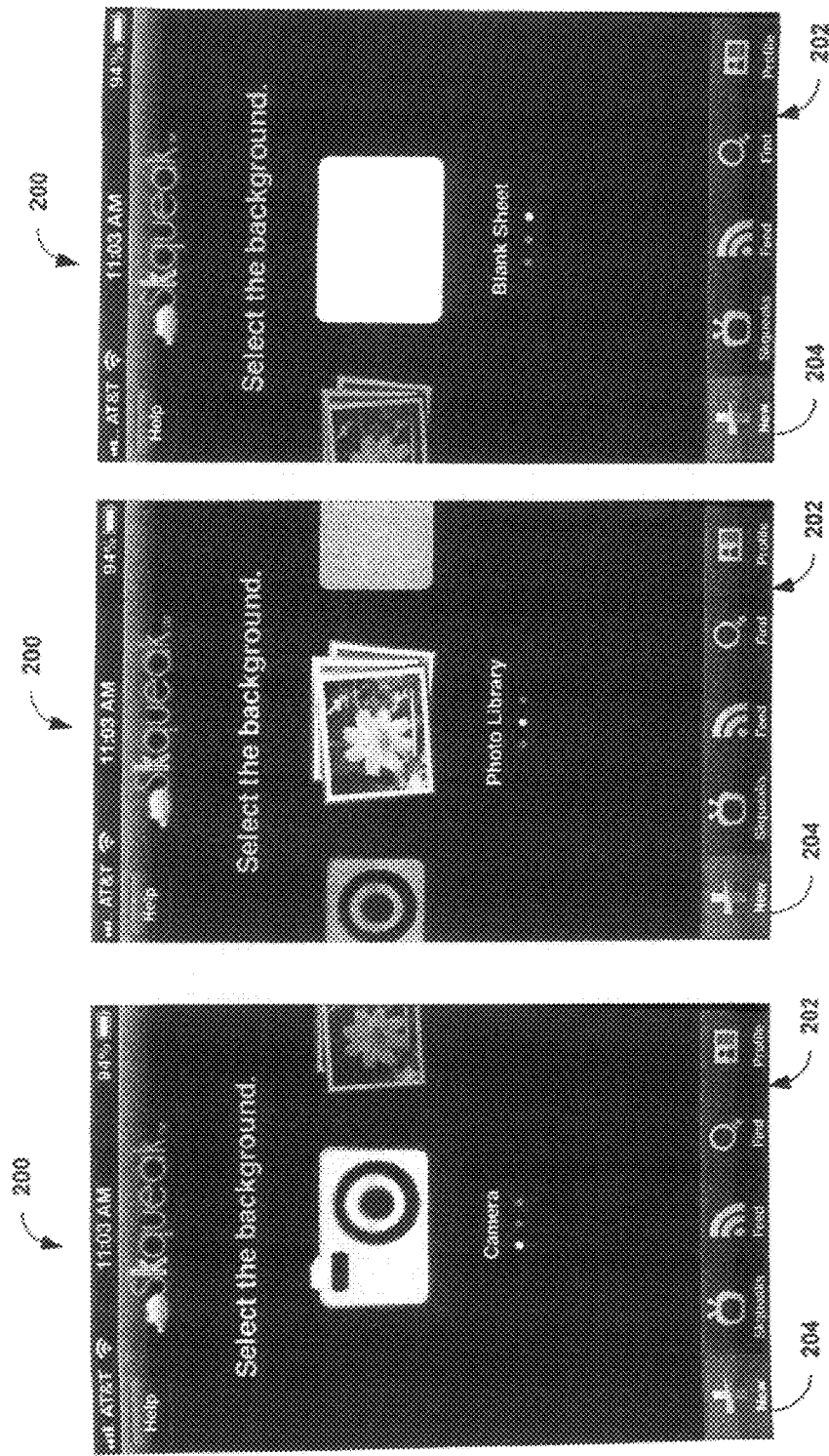
FIGS. 2A-C is an illustration of an embodiment of a user interface screen of the invention by which a user can choose a visual image as a background for creating the electronic message of FIG. 1.

Once the application software is downloaded to the user's device, and the user has launched the application, a user interface (UI) screen is displayed that prompts the user to choose a visual medium (102, FIG. 1) to serve, at least initially, as the background for the message (100, FIG. 1). As described above, the visual medium (102, FIG. 1) can be a photo image, a sequence of photo images or a sequence of images from a video, full video, maps, documents and the like. FIGS. 2A-C illustrate such a user interface 200, which is an embodiment of a mobile handset user interface of the invention.

In an embodiment, the UI interface screen 200 has a control panel 202, including buttons for the initiation of various functions, including the creation of a new multimedia message of the invention by touching, clicking on or otherwise activating button 204. The screen initially prompts a user to select and directly import a photo image from a camera, either coupled to or integrated within the user's mobile handset device as shown in FIG. 2A. The UI screen 200 can be advanced by, for example touching the screen and sliding the finger touching the screen from right to left to prompt the user to select and import an image to the application from a photo library stored within the user's device as shown in FIG. 2B. Through similar action, the UI screen 200 can be advanced to prompt the user to select one of a pre-established set of visual media templates provided by the application program to serve as background media (102, FIG. 1) for the message (100, FIG. 1) as shown in FIG. 2C. Those of skill in the art will appreciate that such templates can be application specific. For example, a football coach wishing to create a message of the invention that communicates instructions regarding player formations, a football field template can be provided as a background choice. In addition, a pre-established set of symbols may be provided (e.g. football player icons) that can be placed on the background template by the user.

Those of skill in the art will recognize that various other embodiments of a UI and UI screens can also be employed, depending upon the type of user device, and which can provide access to other forms of visual content, including but not limited to, sequences of photos and video images, video, maps, a CAD model, a blueprint, 3D models, radiological images, ultrasonic images, and documents of various formats without exceeding the intended scope of the present invention. The file format for such background media can be virtually any displayable file format including those used for documents such as .pdf, .doc, notes, .ppt, keynote, numbers and other formats used in various fields such as CAD, EDA, etc.

Figure 3:
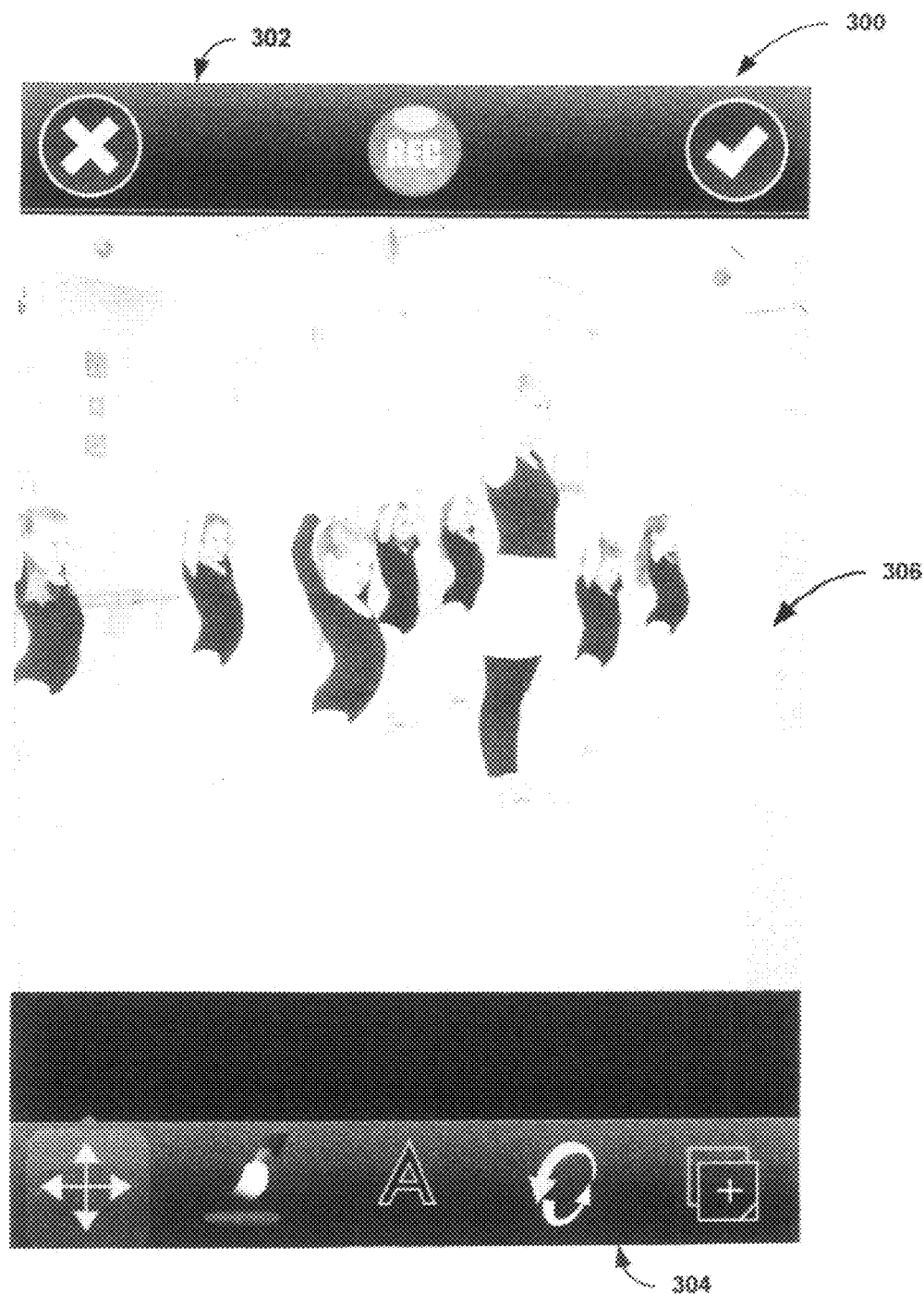
FIG. 3 is an illustration of an embodiment of the user interface screen after selection of a visual image of the electronic message using the user interface of FIGS. 2A-C.
Figure 4:
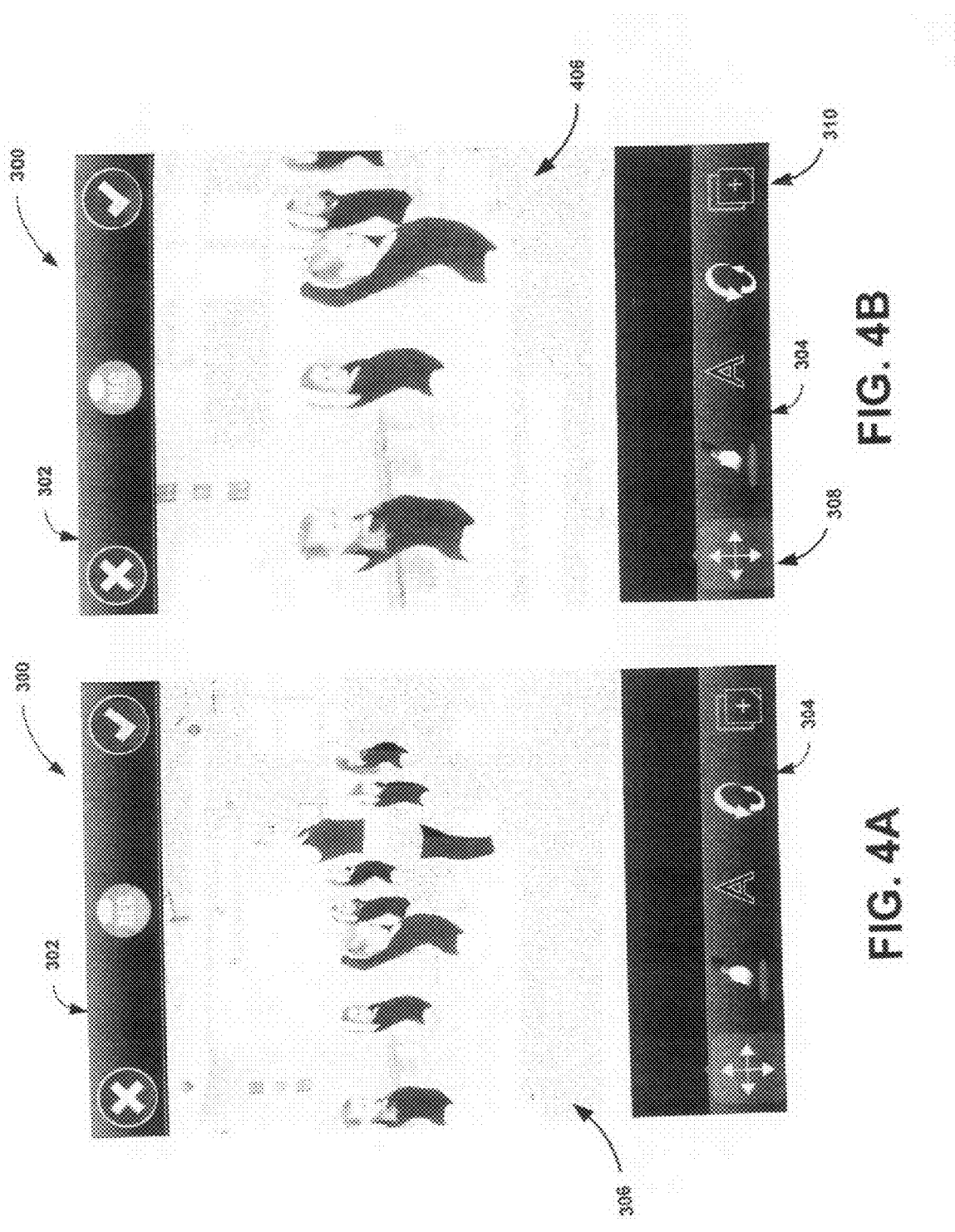
FIGS. 4A-B illustrate the selected visual image of FIG. 3 before and after, respectively, application of user interactive pan and zoom events to the background visual image before the initiation of audio recording.

FIG. 3 illustrates a second UI screen 300 that is displayed on the user's device in response to the selection of a background visual medium (102, FIG. 1). UI screen 300 displays the selected image 306, along with control panels 302 and 304. FIG. 4A illustrates the UI screen 300 just as it displays selected image 306 just prior to, and FIG. 4B illustrates the UI screen 300 just after, the initiation of user-interaction events in the form of a pan and zoom that are reflected in the newly displayed image 406 of FIG. 4B. These user-interaction events are initiated by the user by activating the "pan-zoom" control button 308 located in control panel 304. The pan and zoom user-interaction events illustrated by FIG. 4B are not correlated to any other media components of the message (100, FIG. 1), and thus will not be animated within the message when played later on by a recipient.

Figure 5:
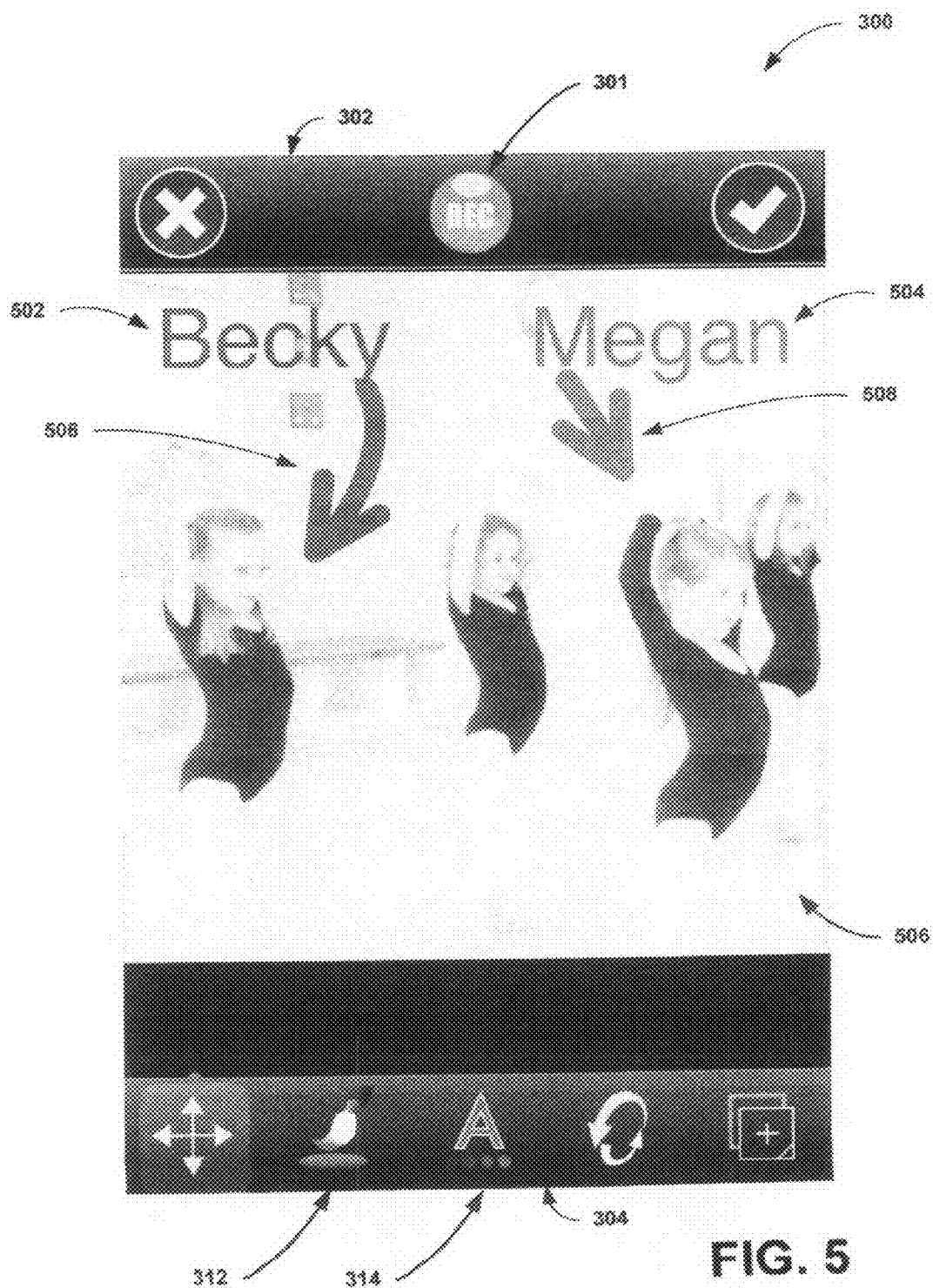
FIG. 5 is an illustration of an embodiment of the user interface screen of FIG. 2 after application of animated user interactive events including adding text and sketching to the background visual image of the electronic message during audio recording.

FIG. 5 illustrates the recording of an audio component for the electronic message of the invention, along with user-interaction events (104, FIG. 1) that are correlated to the audio component (106, FIG. 1) and thus will appear as animated events while the message (100, FIG. 1) is being played. The user first activates the record (i.e. "REC") button 301 located in control panel 302. The user is then able to record an audio component (106, FIG. 1) through a microphone that is either coupled to, or integrated within, the user's device. The recorded audio can be, for example, a voice-over description of the image 406 and can reference the user-interaction events (104, FIG. 1) created by the user during the recording process. 26. In the alternative, the user may use an audio track that is pre-recorded, or a combination of a pre-recorded track, audio tracks from video, and recorded voiceover tracks. In the example of FIG. 5, the user has drawn an arrow 506 and typed text 502 in one color, and then has drawn arrow 508 and typed text 504 in a second color. The user selects drawing mode by clicking on button 312 and text mode by clicking on button 314 in the control panel.

Because the user-interaction events (104, FIG. 1) described above were initiated while recording the audio component (106, FIG. 1), they will be displayed as an animation (i.e. they will be sketched and/or typed onto the background image (102, FIG. 1)) at the same points in time with respect to the audio component (106, FIG. 1) every time the message (100, FIG. 1) is viewed subsequently. This ensures that the animations will be correlated with the audio as intended by the user, so that arrow 506 is being drawn and the type 502 is appearing on the image as the user is speaking about subject Becky in the background image (102, FIG. 1).

Figure 6:
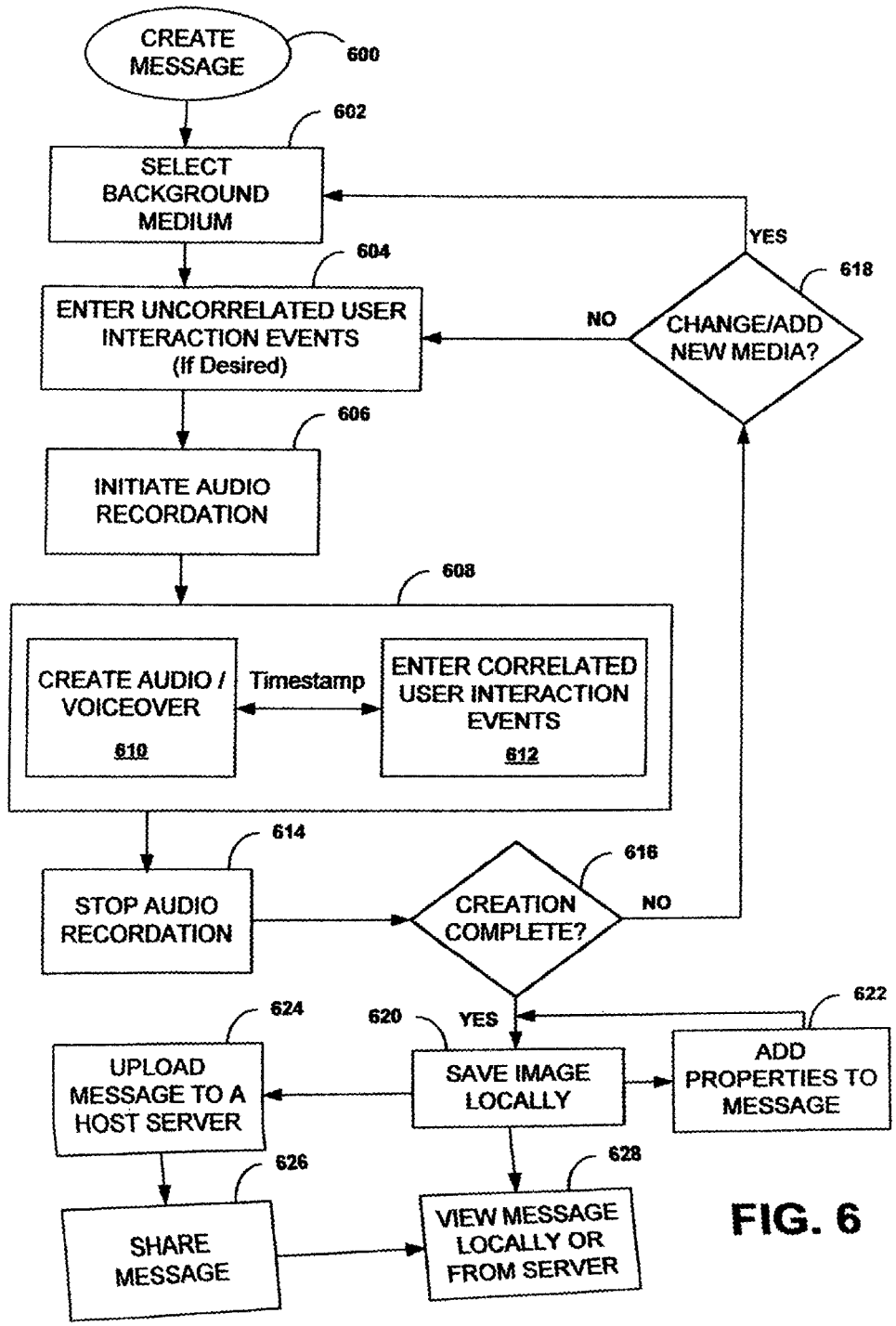
FIG. 6 is a procedural flow diagram illustrating an embodiment of a method of the invention for creating electronic messages of the invention.

FIG. 6 is a procedural flow diagram illustrating an embodiment of a method for creating the multimedia message of the invention (100, FIG. 1). The method starts at 600, when the process of creating the multimedia message (100, FIG. 1) of the invention is initiated, as previously described, such as by activating "New" button 204 on a UI screen 200 as illustrated in FIGS. 2A-C. Processing then proceeds to block 602, where the background visual medium is selected for the message as was previously discussed. At block 604, user interaction events can be applied, such as the pan and zoom events discussed above with respect to FIGS. 4A-B. Those of skill in the art will recognize that other user-interaction events (104, FIG. 1) can also be applied at processing block 604. Processing then proceeds to block 606 when the recording process is initiated. As discussed above with reference to FIG. 5, the recording process can be initiated by activating the "Rec" button 301 of the UI screen 300.

Processing then proceeds to block 608, during which the audio component of the message, such as a voiceover, is recorded as indicated by block 610. While the audio is recorded, any user-interaction events conducted by the user as indicated by block 612 are correlated to the time-line of the audio component. In essence, the user-interaction events that transpire during the audio recording process are time-stamped by the time-line of the audio component. The user-interaction events can be sketching and text animations such as those illustrated with respect to FIG. 5. They can also be the addition of symbols, shapes, emoticons, as well as image transformation events such as the pan and zoom events illustrated by FIGS. 4A-B. At this time, the Rec button 301 of the UI can be made to blink and a visible timer runs to indicate to the user that the recording and the time-line are active.

Recording can then be discontinued by the user at 614, for example by activating the "Rec" button 301 a second time, and processing then continues at decision block 616. If the user has not completed adding content to the message, the answer at block 616 is "NO" and processing continues at decision block 618, where it is determined if the user wishes to change the visual background medium or add a new one. If the answer is "YES" processing returns to processing block 602, where the user can choose a new visual background medium as previously described by activating the "Plus" button (310, FIGS. 4A-C). From there, processing will continue through the flow as previously described. If the answer at decision block 618 is "NO" processing returns to processing block 604, where uncorrelated user-interaction events can be added if desired as previously described. Processing then continues as previously described, where additional audio and correlated user-interaction events can be added at block 608 and processing ending finally back at decision block 616 once again.

Processing can continue to repeat through this loop until the user has completed adding media content to the message, and the answer at decision block 616 is "YES." Processing then continues to block 620, where the message is saved locally at the user's device. Processing is then able to proceed in parallel, where the user can begin uploading the message to a host server at block 624, while adding additional information associated with the image at block 622. This additional information can include a title for the message, a tag information for facilitating a search for the message once uploaded to the server, an author name or username, and a thumbnail image for the message that can represent the message to a recipient before playing the message. This information is then saved along with the image locally at block 620 and is ultimately uploaded to the server as well at block 624.

Once saved locally at block 620, the message of the invention can be viewed at block 628 from the user's device in its completed form. Once uploaded to the host server at block 624, the message can be shared with other recipients at block 626, who are able to download and view the message at block 628 from the host server to their respective devices through a UI that facilitates access to the message, as well as other such messages created by other users.

Figure 7:
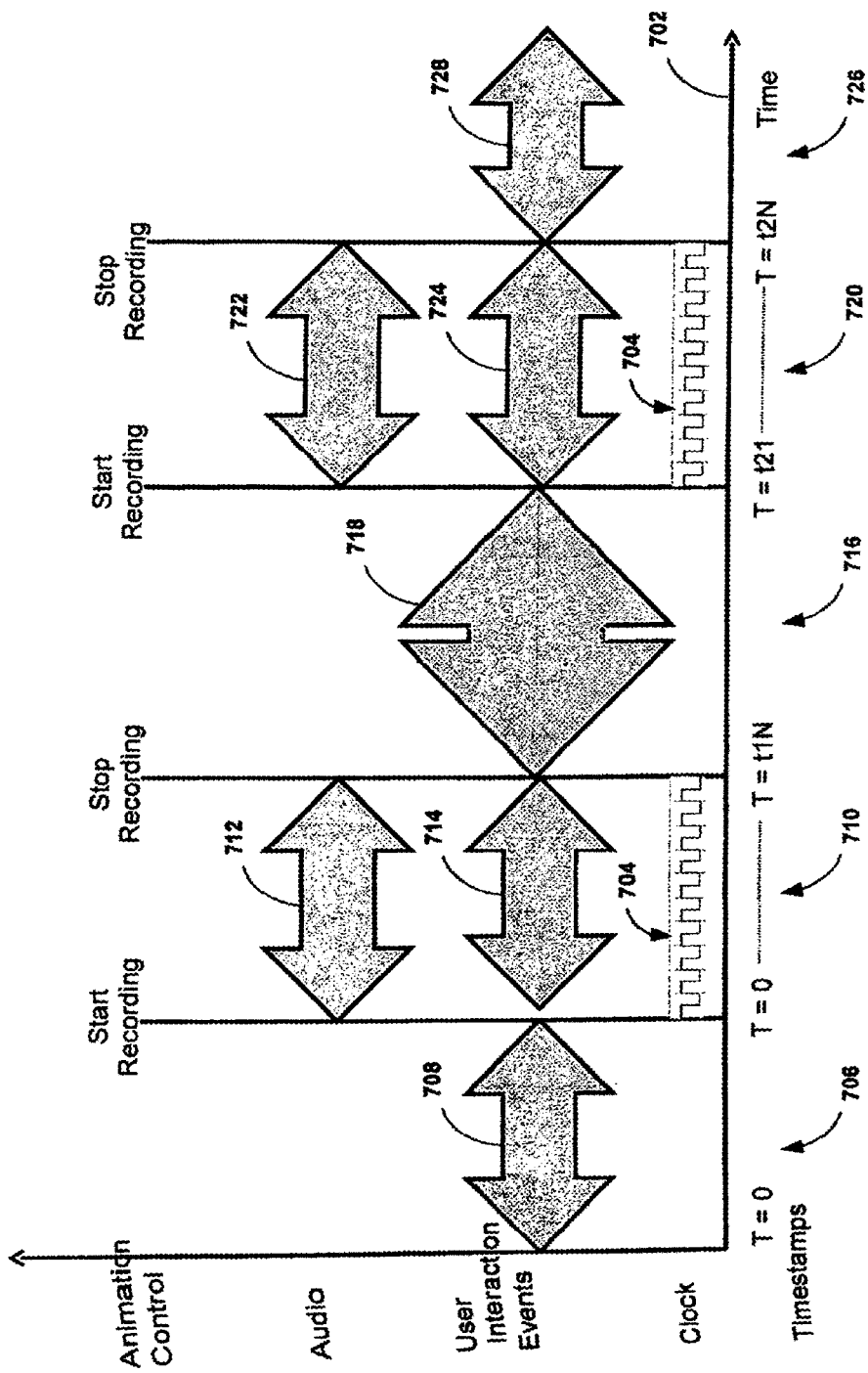
FIG. 7 is time line diagram illustrating the creation of a message of the invention in accordance with the procedural flow of FIG. 6.

FIG. 7 illustrates a time-line that corresponds to the creation of an electronic multimedia message of the invention, and which defines the time-line 702 for the message as it is viewed. The time interval 706 corresponds to the selection of a background visual medium 708 that is performed at block 602 of the procedural flow of FIG. 6. During this process, it should be noted that the time-line 702 does not advance (i.e. it is frozen), and T=0 throughout this step of the process. In this example of FIG. 7, no uncorrelated user-interaction events are introduced (block 604, FIG. 6). Interval 710 corresponds to processing block 608 of FIG. 6, and is initiated at time T=0 by selecting the recording function (block 606, FIG. 6). The audio component of the message (e.g. a voice over, pre-recorded audio track) 712 is recorded during this interval 710. The system clock 704 is used mutually to time-stamp the audio component 712 as it is being recorded (block 610, FIG. 6), as well as any user-interaction events 714 that are created (block 612, FIG. 6) during the recording process (block 608, FIG. 6).

It will be appreciated by those of skill in the art that if the audio track is a pre-recorded track, the track will be played during the interval, rather than actually being recorded for the first time, such as through a microphone. Nevertheless, this is still a "recording" function for purposes of correlating any user-interaction events applied to the background medium with the audio tract during the interval 710. It will also be appreciated that the timestamps may have a clock frequency that is defined by the operating system, or in the alternative, it may be a function of the internal clock of the client device use to create the message of the invention.

In the example of FIG. 7, the user wishes to add a second background visual component to the message before continuing with the message. Thus, the recording process is terminated at T=t1N of FIG. 7, corresponding to block 614, FIG. 6, and because the user has not completed the message, processing returns to block 602 where the selection process is repeated during untimed interval 716. In the example of FIG. 7, a number of uncorrelated user-interaction events are introduced (block 604, FIG. 6), that can include for example, a pan, a zoom, a sketch, the input of text, etc. Recording is then re-initiated (block 606, FIG. 6) by the user at time T=t21, and additional audio 722 is recorded and time-stamped during interval 720 using system clock 704 (block 608, FIG. 6). Additional user-interaction events 724 are also introduced that are time correlated to the audio 722. Recording is then terminated by the user at time T=t2N (block 614, FIG. 6). Those of skill in the art will appreciate that this procedural loop can repeated as many times as is necessary for the message to be completely created. In the example of FIG. 7, the user has completed the message creation method of the invention (600, FIG. 6), and the user then saves and shares 728 the message during interval 726 as previously described above (blocks 622, 624, 626 and 628, FIG. 6).

When the creation process is completed, all of the captured event objects are serialized to flash memory. A message's time-line consists of a set of key-value data which can be represented using, for example, the JSON format. In this way, external viewers can degrade gracefully and maintain a degree of forward and backward compatibility with viewing software. Missing keys can be defaulted corresponding to the known version number, and extra keys can be ignored. In addition, any given key that is unknown can provide an alternate set of key-value instructions to the viewing software to approximate the unknown key or warn the user that a particular feature is missing.

Those of skill in the art will appreciate that the time-line 702 of FIG. 7 will also dictate how the message "plays" for a user who views the message of the invention. When the message of the invention is played, it is only the timed intervals 710, 720 that are actually animated. The selected background visual medium, and the results of any uncorrelated user-interaction events (if any) that are introduced during the intervals 706 and 716 are already reflected in what is seen by the user at times T=0 and T=t21. Only the user-interaction events introduced during the recorded intervals 710 and 720 are seen as they are introduced, and the occurrence of those events are timestamped and displayed as they happen at the times they occur during the audio recording process. In this way, the background visual components can be set up with an initial condition of that component just at the point the user wishes to begin his or her real-time interaction therewith. Then, only those user-interaction events that the user wishes to be viewed as they actually occur can be correlated to the audio for purposes of enhancing the message of the invention.

The user-interaction animation events such as sketching, typing, drag and drop of icons, and image transformation events such as panning, rotating and zooming can be rendered during playback based on the fact the system clock fires an event periodically (synchronized with the vertical refresh rate of the display system of the user's device). On this event, an audio playback object is interrogated for the current time-tamp. Based on this current time-stamp, the system renders the state of the display with the appropriate user interaction events to produce for example, a sketch animation, a text animation or an image transformation. The user can scrub the time-line and the appropriate audio and display is rendered. Those of skill in the art will recognize that scrubbing refers to a process of manually scrolling through an animation, forward and backward, previewing the animation, pausing where desired. Those of skill in the art will recognize that in the special case where there is no audio component recorded, system time can be used.

Those of skill in the art will appreciate that the method of the invention also permits a great deal of freedom to a user that wishes to incorporate video as a background visual medium (102, FIG. 1), and particularly the ability to mix and match time-lines obtained from the video and that of the voiceover recording, as well as the mixing of audio tracks from both sources. It will be further appreciated that the time-line and the associated media/events can be compressed and expanded either manually or automatically.

Those of skill in the art will appreciate that the method of the invention for creating the multimedia messages of the invention also provides the ability for a user, or even a recipient with permission to do so, to edit the message, including re-recording the audio and altering the user-interaction events during the recording interval, or even adding additional media components to the message. It should be noted that if the audio track length exceeds the time-line of the message while re-recording the audio, the last frame of the message is shown, while the audio continues. If there was no time-line previously recorded, then the voiceover creates a time-line and continues over the static image. However, if the audio track length is less than the time-line of the message, it is filled with blank audio, for the rest of the time-line.

The ability for permitting certain users to access and edit the electronic multimedia message of the invention once created by a first user, permits collaboration with other users. Collaboration can be enhanced by, for example, providing the ability to highlight the contributions of each user in the viewer. This is can be achieved by merging various inputs from each user on the server. Editing may be further facilitated by enabling the users to click on graphical information elements in the background in the viewer, and advancing the time-line to the appropriate point in the time-line in a message of the invention.

Another feature that can enhance the editing of a message of the invention can include an undo feature that the audio recording rewinds to an appropriate position while giving the user audio and visual cues that it is doing so. Another editing feature can allow the user to control the speed of the visual playback, pausing longer in some places and playing back faster in others, while the user re-records the audio of the message being edited. Yet another editing feature can be to transcribe the audio to enhance the searchability of the message being edited, as well as to click on a subset of the transcribed audio to effect a jump to the corresponding point in the time line of the message.

With reference to the example message of the invention of FIGS. 4A and 4B, the message when played will start with the image 406 displayed in FIG. 4A, as the pan and zoom events were introduced prior to recording any audio. The sketch 506, 508 and text 502, 504 events illustrated by FIG. 5, will actually appear to be drawn or typed while the message, including the audio component of the message, is being played. Thus, the image 506 displayed in FIG. 5 is the end of result of playing at least that timed interval portion of the message of the invention.

Figure 8:
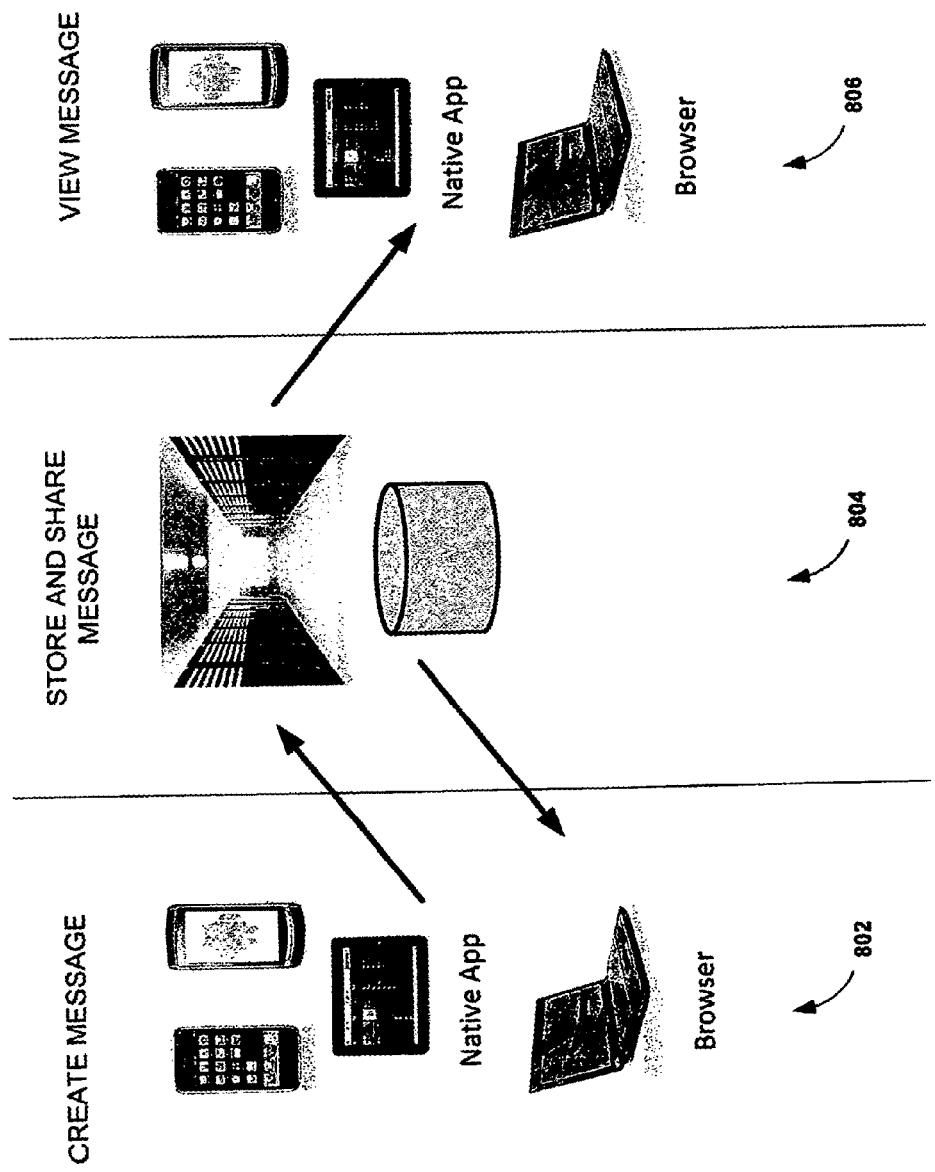
FIG. 8 is an illustration of a network environment for the creation, storing, hosting, retrieval, sharing and viewing of electronic messages of the invention.

FIG. 8 illustrates an embodiment of a system network environment by which the electronic multimedia messages of the invention can be created and shared. As previously discussed, the messages of the invention can be created on various user devices (e.g. computer, mobile or handheld device) 802 coupled to a network such as the Internet. The software necessary for performing the method of the invention (600, FIG. 6) for creating the messages can be a native application that is downloaded from a web site hosting the messages onto the user device 802. The software can also be temporary software (e.g. Javascript or Flash code) that is downloaded from the host 804 to and executed by a browser application running on device 802). The created messages can then be uploaded to a server hosting the web site 804 for the storing and retrieval of such messages. Users can then use various user devices 806 for accessing the web site 804, including searching, selecting and downloading the messages from the web site to the devices for viewing purposes.

Once uploaded to the web site 804, the messages 100 of the invention can be made private or public, can be organized into channels based on topic, and users can even leave comments. For private channels, users can invite a list of subscribers based on the user ids of existing members, or simply based on email addresses. Upon receiving an invitation to subscribe to a channel, the invitee can then log in to the website 804 to view the message. Unregistered users can view public messages, and can be provided the option to register so that they may view private channel messages of the invention. In addition registered users can be permitted to comment, like and share messages created by others.

Once a message 100 of the invention has been created and uploaded to the web server of web site 804, it can be shared by users in numerous ways. For example, the user can post a link to the message on various social networking sites such as Facebook and Twitter, embedding code in a blog, or by sending an email or SMS that includes the link. Clicking on the link enables the execution of a message player UI on the browser of user's device. The user can also messages 100 on his or her user device using the same custom application that was executed for performing the method (600, FIG. 6) of creating the messages of the invention.

Figure 9B:
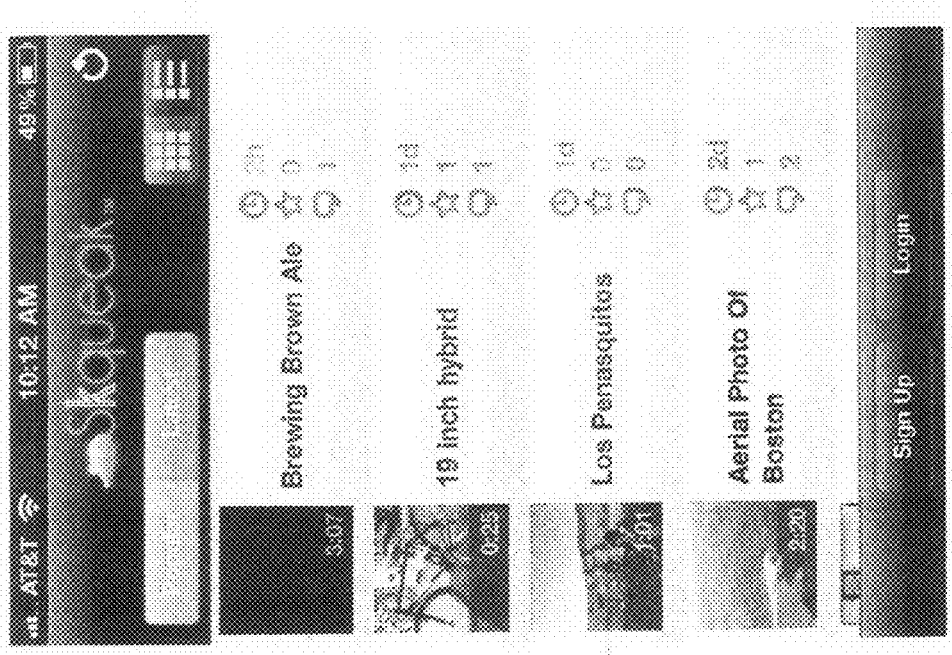
FIGS. 9A-B illustrate an embodiment of a user interface for displaying, selecting, sharing and viewing hosted electronic messages of the invention stored on the web server of FIG. 8.
Figure 9A:
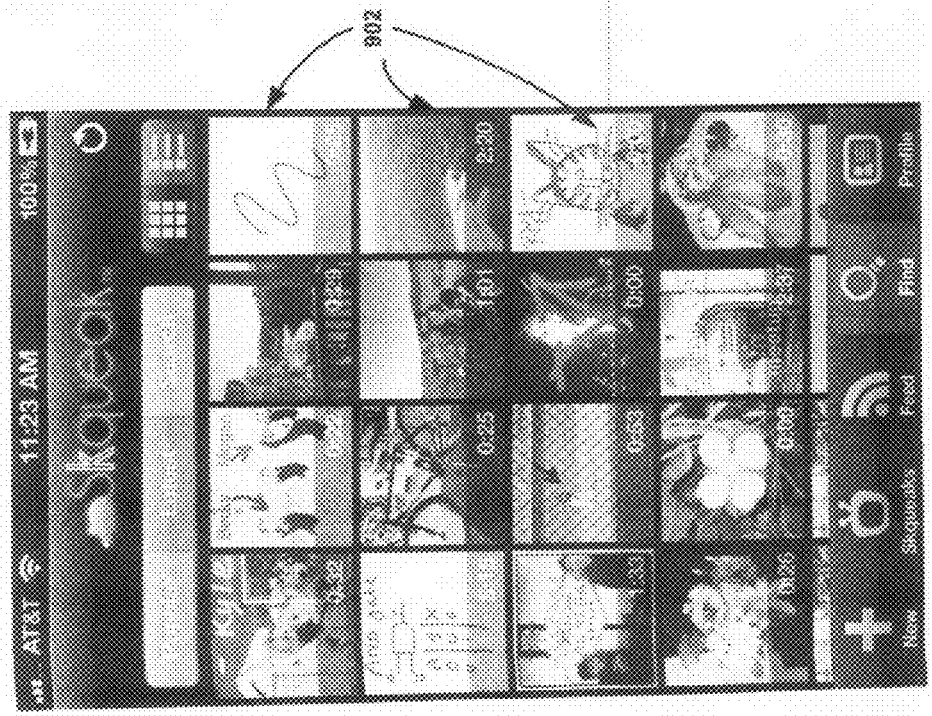

FIGS. 9A-B illustrate an embodiment of a UI screen, similar to the one illustrated in FIGS. 2A-C, 3, 4A-B and 5. In this case, the UI is accessing the website 804 of FIG. 8, and is displaying thumbnail images 902 associated with the messages as they were created and displayed as previously described with respect to processing block 622 of FIG. 6. FIG. 9A shows a display that provides a view of thumbnail images for numerous messages 912 of the invention available for download and viewing. FIG. 9B illustrates a more focused view of the messages stored on the server, including more detailed information such as the author, when the message was created, etc.

Figure 10:
FIG. 10 is an illustration of an embodiment of a user interface screen upon selection of one of the electronic messages of the invention for viewing.

FIG. 10 illustrates the view of a selected message 1000 of the invention, accessed and downloaded from the web site, ready to be played with its initial visual image displayed on a user device. Additional information is provided by the UI screen illustrated, including the title of the message 1002, the author and date created 1003, and thumbnails of other messages created by the same user 1006. Links 1004 are also included by which the user can share the selected message of the invention 1000 through other social networking websites such as Twitter and Facebook.

In an alternative embodiment, rather than deploying a central server for hosting messages of the invention, the messages can be created, stored and viewed locally on user client devices, and directly communicated from one user client device to another. The messages of the invention can be created, and viewed by each user using the native software application running on each client device, the execution of which performs the method of the invention (600, FIG. 6). In another alternate embodiment, the messages of the invention may be hosted on multiple servers, each server handling a subset of users, such as an enterprise satisfying the communication needs of all of its employees or a medical institution that serves the communications of its entire staff.

Those of skill in the art will appreciate that numerous other techniques for processing visual media can be incorporated into the method of the invention for creating electronic multimedia messages of the invention. For example, known techniques that place special emphasis on certain areas of the visual media where the user interacts with the media, including darkening the rest of the background medium and brightening the area being emphasized relative to it, thereby achieving a spotlight effect. If the background visual medium is a video clip, the spotlight can change its position by tracking a feature in each frame of the clip. For example, a baseball in a sports clip can be spotlighted and tracked. In another example, sketch events can be snapped relative to an object in the background by detecting object features as is known in the art. In still another example, the sketch can be snapped relative to a virtual created grid overlaid in the background medium of the message. Alternatively it may be snapped relative to another sketch element that it self provides snapping cues.

Other processing techniques that might be applied to refine the message of the invention can include curve/stroke smoothing, line detection, arc detection, and corner finding algorithms known in the art may be used for filtering the sketch input. In an alternate embodiment, pattern recognition algorithms known in the art can be used, and the sketch input may be processed to recognize various shapes, numbers, letters and symbols that can be domain specific.

The electronic multimedia message of the invention, and its method and system for creating same, provide an elegant and user-friendly technique by which users may interact with visual media to introduce uncorrelated user-interaction visual events and as well as those correlated to an audio component, thereby enhancing the exchange of information between other individuals over known messaging techniques.

The invention claimed is:

1. A method for creating an electronic multimedia message, said method comprising:
    selecting and displaying at least one background visual medium;
    recording at least one audio track;
    applying one or more user-interaction events to alter the viewed appearance of the selected at least one background visual medium, at least one of the applied one or more user interaction events being time-correlated with the at least one recorded audio track;
    generating a set of message events in the form of a time-line, each of the set of message events representative of said selecting, said recording and said applying, the time-line representing the order of occurrence of the set of message events and any time-correlation therebetween; and
    saving the set of events of the message to memory in a format that permits the set of events to be retrieved and played as a multimedia message in accordance with the timeline.

2. The method of claim 1, further comprising viewing the message, said viewing further comprising:
    accessing the set of message events of the message from memory; and
    in accordance with the time-line, playing the multimedia message by:
        displaying the selected at least one background visual medium;
        displaying alterations to the viewed appearance of the selected at least one background visual medium as generated by the applied one or more user-interaction events; and
        playing the recorded at least one audio track.

3. The method of claim 1, wherein the at least one time-correlated of the applied one or more user-interaction events is applied to the selected at least one visual medium during the recording of the at least one audio track, the altered visual appearance to the selected at least one visual medium generated by the application being time-stamped in accordance with the timing of the at least one recorded audio track.

4. The method of claim 1, wherein the at least one time-correlated of the applied one or more user-interaction events is applied to the selected at least one visual medium during playback of the at least one recorded audio track, the altered visual appearance to the selected at least one visual medium generated by the application being time-stamped in accordance with the timing of the playback of the recorded at least one audio track.

5. The method of claim 1, wherein at least one of the one or more user-interaction events is applied while not recording the recorded at least one audio track.

6. The method of claim 1, wherein the at least one audio track is recorded during playback of the time-correlated at least one of the one or more user-interaction events.

7. The method of claim 2, further comprising uploading the saved message to a host server over a network.

8. The method of claim 7, wherein said viewing further comprises downloading the message from the host server to a client device over the network, the downloaded message being stored in the memory of the client device.

9. The method of claim 1, wherein the selected at least one background medium is an image file.

10. The method of claim 1, wherein the selected at least one background medium is a video file.

11. A computer software system product having a set of instructions for controlling one or more computer devices to enable a user to create and view an electronic multimedia message, the software system stored on non-transitory computer-readable media and when executed by the one or more computer devices, carrying out a method comprising:
    selecting and displaying a background visual medium;
    recording an audio track;
    applying none, one or more user-interaction events to alter the visual appearance of the selected visual background medium that are not time-correlated with the recorded audio track;
    applying one or more user-interaction events to alter the visual appearance of the selected background visual medium that are time correlated with the recorded audio track;
    repeating said selecting and displaying, recording and applying as required until the message is complete;
    generating a set of message events in the form of a time-line, each of the set of message events representative of said selecting, said recording and said applying, the time-line representing the order of occurrence of the set of message events and any time-correlation therebetween; and
    saving the set of message events to memory in a format that permits the set of message events to be retrieved and played as a multimedia message in accordance with the timeline.

12. The software system product of claim 11, further comprising viewing the message, said viewing further comprising:
    accessing the set of message events from memory; and
    in accordance with the time-line, playing the multimedia message by:
        displaying the selected background visual media;
        displaying alterations to the viewed appearance of the selected background visual media as generated by the applied one or more user-interaction events; and
        playing the recorded audio tracks.

13. The software system product of claim 11, wherein the at least one time-correlated of the one or more applied user-interaction events is applied to the selected at least one visual medium during said recording an audio track, the visual changes to the selected at least one visual medium generated by the application being time-stamped in accordance with the timing of the recorded audio track.

14. The software system product of claim 11, wherein the time-correlated at least one user-interaction event applied is a sketching event.

15. The software system product of claim 11, wherein the time-correlated at least one user-interaction event applied is an image transformation event.

16. The software system product of claim 11, wherein the software system includes a native application program that is stored in the memory of, and is executed by, a user computer device.

17. The software system product of claim 12 further comprising uploading the saved message to a host server of a web site over the Internet.

18. The software system product of claim 17 wherein said viewing further comprises downloading the message from the web server to a client computer device over the network, the downloaded message being stored in the memory of the client device.

19. The software system product of claim 11, wherein the software system includes temporary code that is downloaded from a host server to the client device and is executed by a browser application running on the client computer device.

20. The software system product of claim 11, further including a user interface for facilitating said selecting, recording and applying.

* * * * *